United States Patent
Nakano et al.

(10) Patent No.: US 6,719,088 B2
(45) Date of Patent: Apr. 13, 2004

(54) VEHICLE STEERING APPARATUS (75) Inventors: Shirou Nakano, Osaka (JP); Ryouhei Hayama, Osaka (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/437,338

(22) Filed: May 13, 2003

(65) Prior Publication Data

US 2003/0213641 A1 Nov. 20, 2003

(30) Foreign Application Priority Data

May 15, 2002 (JP) ........................................ 2002-139794

(51) Int. Cl.$^7$ ................................................. B62D 5/04
(52) U.S. Cl. ........................ 180/402; 180/446; 701/41
(58) Field of Search ................................ 180/402, 443, 180/444, 446; 701/41, 42, 43

(56) References Cited

U.S. PATENT DOCUMENTS

| | | | | |
|---|---|---|---|---|
| 5,347,458 A | * | 9/1994 | Serizawa et al. | 701/41 |
| 6,041,885 A | * | 3/2000 | Watanabe et al. | 180/444 |
| 6,389,924 B1 | * | 5/2002 | Ryne et al. | 74/493 |
| 6,449,543 B2 | | 9/2002 | Nishizaki et al. | |
| 6,488,115 B1 | * | 12/2002 | Ozsoylu et al. | 180/444 |
| 6,625,530 B1 | * | 9/2003 | Bolourchi | 701/42 |
| 6,659,218 B2 | * | 12/2003 | Thomas et al. | 180/402 |

FOREIGN PATENT DOCUMENTS

EP  1 097 855  5/2001

\* cited by examiner

*Primary Examiner*—Avraham Lerner
(74) *Attorney, Agent, or Firm*—Jordan and Hamburg LLP (57) ABSTRACT

A steering actuator can be controlled such that the ratio between amount of operation of an operating member and amount of steering of vehicle wheels changes. Movement of the steering actuator is transmitted to the vehicle wheel such that variation in steering angle is generated. A relationship between behavior index value for operating corresponding to change in behavior of the vehicle caused by change in steering angle, target behavior index value for operating corresponding to amount of operation of the operating member, and target operating torque is stored. The target operating torque is calculated from the stored relationship, the determined behavior index value for operating, and the determined target behavior index value for operating. An operating actuator for generating torque which acts upon the operating member is controlled such that the operating torque of the operating member corresponds to the target operating torque.

6 Claims, 5 Drawing Sheets

VEHICLE STEERING APPARATUS

FIELD OF THE INVENTION

The present invention relates to a steering apparatus for a vehicle which is capable of varying the ratio between amount of operation of an operating member and amount of steering of vehicle wheels.

DESCRIPTION OF THE RELATED ART

A vehicle steering apparatus has been developed which is capable of varying a steering characteristic by varying the ratio between the amount of operation of the operating member and the amount of steering of the vehicle wheels, when movement of a steering actuator is caused by operation of the operating member and transmitted to the vehicle wheels in order to vary the steering angle. An apparatus employing a so-called steer-by-wire system in which the operating member is not mechanically connected to the vehicle wheels and an apparatus in which the operating member is mechanically connected to the wheels are known as such a steering apparatus. In a steering apparatus employing the steer-by-wire system, without mechanically connecting the operating member in the form of a steering wheel to the vehicle wheels, the ratio between the amount of operation and the amount of steering is varied by controlling the steering actuator, when movement of the steering actuator is transmitted to the vehicle wheels in order to vary the steering angle through a steering gear. In the steering apparatus in which the operating member is mechanically connected to the wheels, the ratio between the amount of operation and the amount of steering is varied, when rotation of the steering wheel is transmitted to the steering gear through a variable transmission ratio mechanism such as a planetary gear mechanism by controlling the steering actuator which drives a ring gear or the like comprising the planetary gear mechanism.

In the steering apparatus employing the steer-by-wire system, external forces based on friction with the road surface such as steering resistance and self-aligning torque are not transmitted to the operating member. In the steering apparatus in which the steering wheel and the vehicle wheels are mechanically connected via the variable transmission ratio mechanism, such steering resistance and self-aligning torque do not correspond to the amount of operation of the operating member. Hence by providing an operating actuator for generating torque which acts upon the operating member, a driver is provided with steering feeling.

It has been proposed that when torque is caused to act upon the operating member by the operating actuator in the vehicle steering apparatus which is capable of varying the ratio between the amount of operation and the amount of steering, this torque is increased and decreased in accordance with the amount of operation. This is to improve driving stability at high speeds and maneuverability at low speeds. In this case, due to the delay that exists between the operation of the operating member and the actual variation in the steering angle of the vehicle, the driver cannot be provided with steering feeling which is matched to the actual variation in steering angle, only by increasing or decreasing the torque which acts upon the operating member in accordance with the amount of operation. This delay between the operation and the actual variation in steering angle is caused by external forces such as steering resistance and self-aligning torque which act on the vehicle wheels on the basis of friction with the road surface. Hence, a method of controlling the operating actuator in consideration of the effects of such external forces has been under consideration to compensate for the delay between the operation and the variation in steering angle and to provide the driver with a steering feeling which is matched to the actual variation in steering angle.

Conventionally, when considering the effects of such external forces, a control system for the operating actuator is constructed based on supposed inertia, viscosity, elasticity, friction and others in the steering force transmission system in a conventional steering apparatus in which the steering wheel and the vehicle wheels are mechanically connected such that the ratio between the amount of operation and the amount of steering cannot be varied. However, characteristics of such inertia, viscosity, elasticity, friction and others differ from vehicle type to vehicle type and from steering apparatus to steering apparatus, causing a problem in that the time and resources required for developing the control system for operating actuator increase.

An object of the present invention is to provide a vehicle steering apparatus which is capable of solving the above problem.

SUMMARY OF THE INVENTION

A vehicle steering apparatus of the present invention comprises: an operating member; an operating actuator for generating torque which acts upon the operating member; a steering actuator; a steering gear for transmitting movement of the steering actuator to vehicle wheels so that variation in steering angle is generated; a sensor for detecting amount of operation of the operating member; a sensor for detecting amount of steering of the vehicle wheels; means for controlling the steering actuator such that the ratio between the amount of operation of the operating member and the amount of steering of the vehicle wheels is varied; means for determining behavior index value for operating corresponding to a change in behavior of the vehicle caused by change in steering angle; means for storing a relationship between the amount of operation of the operating member and target behavior index value for operating; means for calculating the target behavior index value for operating from the stored relationship and the detected amount of operation; means for storing a relationship between the behavior index value for operating, the target behavior index value for operating, and target operating torque; means for calculating the target operating torque from the stored relationship, the determined behavior index value for operating, and the determined target behavior index value for operating; and means for controlling the operating actuator such that operating torque of the operating member corresponds to the target operating torque.

According to the present invention, torque is caused to act upon the operating member by controlling the operating actuator on the basis of change in behavior of the vehicle caused by a change in steering angle, and thus a driver can be provided with steering feeling which is matched to the actual change in steering angle. Furthermore, since there is no need to consider inertia, viscosity, elasticity, friction and others in the steering force transmission system, time and resources required for developing a control system for the operating actuator can be greatly reduced.

It is preferable that the target operating torque includes a component value corresponding to a deviation obtained by subtracting the behavior index value for operating from the target behavior index value for operating. Therefore the operating torque can be increased in a transient state in which the behavior index value for operating has not reached the target behavior index value for operating, and thus divergence in the behavior of the vehicle can be prevented.

It is preferable that the component value corresponding to the deviation obtained by subtracting the behavior index value for operating from the target behavior index value for operating varies in accordance with the vehicle speed. Therefore operating torque can be reduced at low speeds to facilitate steering.

It is preferable that the vehicle steering apparatus of the present invention comprises means for determining behavior index value for steering corresponding to change in behavior of the vehicle caused by change in steering angle, means for storing a relationship between the amount of operation of the operating member and target behavior index value for steering, means for calculating the target behavior index value for steering from the stored relationship and the detected amount of operation, means for storing a relationship between the behavior index value for steering, the target behavior index value for steering, and target amount of steering, and means for calculating the target amount of steering from the stored relationship, the determined behavior index value for steering, and the determined target behavior index value for steering, wherein the steering actuator is controlled such that the amount of steering of the vehicle wheels corresponds to the target amount of steering.

Thus the steering actuator can be controlled on the basis of change in behavior of the vehicle caused by change in steering angle, and since there is no need to consider inertia, viscosity, elasticity, friction and others in the steering force transmission system, time and resources required for developing a control system for the steering actuator can also be greatly reduced.

In the vehicle steering apparatus of the present invention, the means for determining the behavior index value for operating and the means for determining the behavior index value for steering preferably comprise a sensor for detecting value which corresponds to acceleration of change in behavior of the vehicle in at least one direction caused by change in steering angle.

In the vehicle steering apparatus according to the present invention, which is capable of varying the ratio between amount of operation of an operating member and amount of steering of vehicle wheels, time and resources required for developing a control system can be greatly reduced.

DESCRIPTION OF THE PREFERRED EMBODIMENTS

Figure 1:
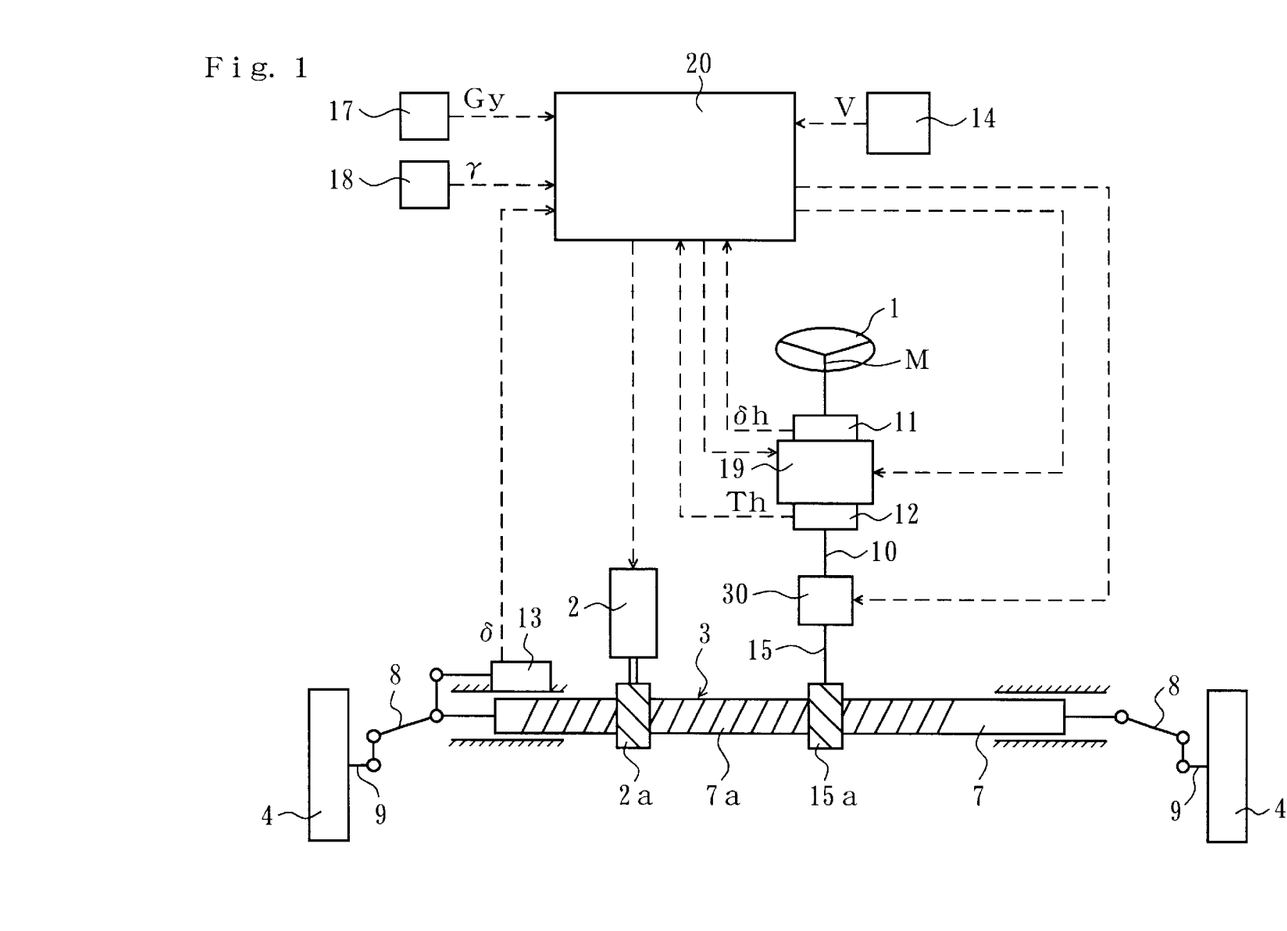
FIG. 1 is an illustrative structural diagram of a vehicle steering apparatus according to an embodiment of the present invention.

A vehicle steering apparatus shown in FIG. 1 comprises an operating member 1 in the form of a steering wheel, a steering actuator 2, and a steering gear 3 for transmitting movement of the steering actuator 2 to vehicle wheels 4 so that variation in steering angle is generated without mechanically connecting the operating member 1 to the vehicle wheels 4.

The operating member 1 is connected to an input side rotary shaft 10, which is rotatably supported by the vehicle body, so as to rotate together with the input side rotary shaft 10. An output shaft of an operating actuator 19 is integrated with the input side rotary shaft 10. The operating actuator 19 is capable of generating torque which acts upon the operating member 1. The operating actuator 19 can be comprised of an electric motor such as a brushless motor.

The steering actuator 2 can be comprised of an electric motor such as a brushless motor. The steering gear 3 is comprised of a movement conversion mechanism for converting the rotary movement of the output shaft of the steering actuator 2 into a linear movement of a steering rod 7. By transmitting the movement of the steering rod 7 to the vehicle wheels 4 via tie rods 8 and knuckle arms 9, the toe angle of each vehicle wheel 4 vary. A known device can be used as the steering gear 3, and the structure thereof is not limited as long as the movement of the steering actuator 2 can be transmitted to the vehicle wheels 4 such that steering angle varies. In this embodiment, the steering gear 3 comprises a rack $7a$ which meshes with a pinion $2a$ attached to the output shaft of the steering actuator 2 and is formed on the steering rod 7. The wheel alignment is set such that the vehicle wheels 4 return to a straight ahead position by means of self-aligning torque when the steering actuator 2 is not being driven.

An angle sensor 11 is provided for detecting operating angle δh as amount of operation of the operating member 1. A torque sensor 12 is provided for detecting torque transmitted by the input side rotary shaft 10 as operating torque Th. A steering angle sensor 13 is provided for detecting steering angle δ as amount of steering of the vehicle wheels 4. The steering angle sensor 13 in this embodiment detects the amount of movement of the steering rod 7 as steering angle δ. A speed sensor 14 is provided for detecting vehicle speed V. A lateral acceleration sensor 17 is provided for detecting lateral acceleration Gy of the vehicle. A yaw rate sensor 18 is provided for detecting yaw rate γ of the vehicle. The angle sensor 11, torque sensor 12, steering angle sensor 13, speed sensor 14, lateral acceleration sensor 17, and yaw rate sensor 18 are connected to a control device 20 comprised of a computer. The control device 20 controls the steering actuator 2 and operating actuator 19.

An output side rotary shaft 15 is mechanically connected to the vehicle wheels 4 so as to rotate in accordance with movement of the vehicle wheels 4 caused by variation in steering angle. For example, the output side rotary shaft 15 is connected to a pinion $15a$ which meshes with the aforementioned rack $7a$ so as to rotate together with the pinion 15. The output side rotary shaft 15 and input side rotary shaft 10 usually perform a relative rotation, but are connected by a connection mechanism 30 such that steering can be performed when a failure arises such as a breakdown of the steering actuator 2 or control system. This connection mechanism 30 is comprised of, for example, an electromagnetic clutch which connects the input side rotary shaft 10 to the output side rotary shaft 15 by a signal from the control device 20 when the failure arises.

Figure 2:
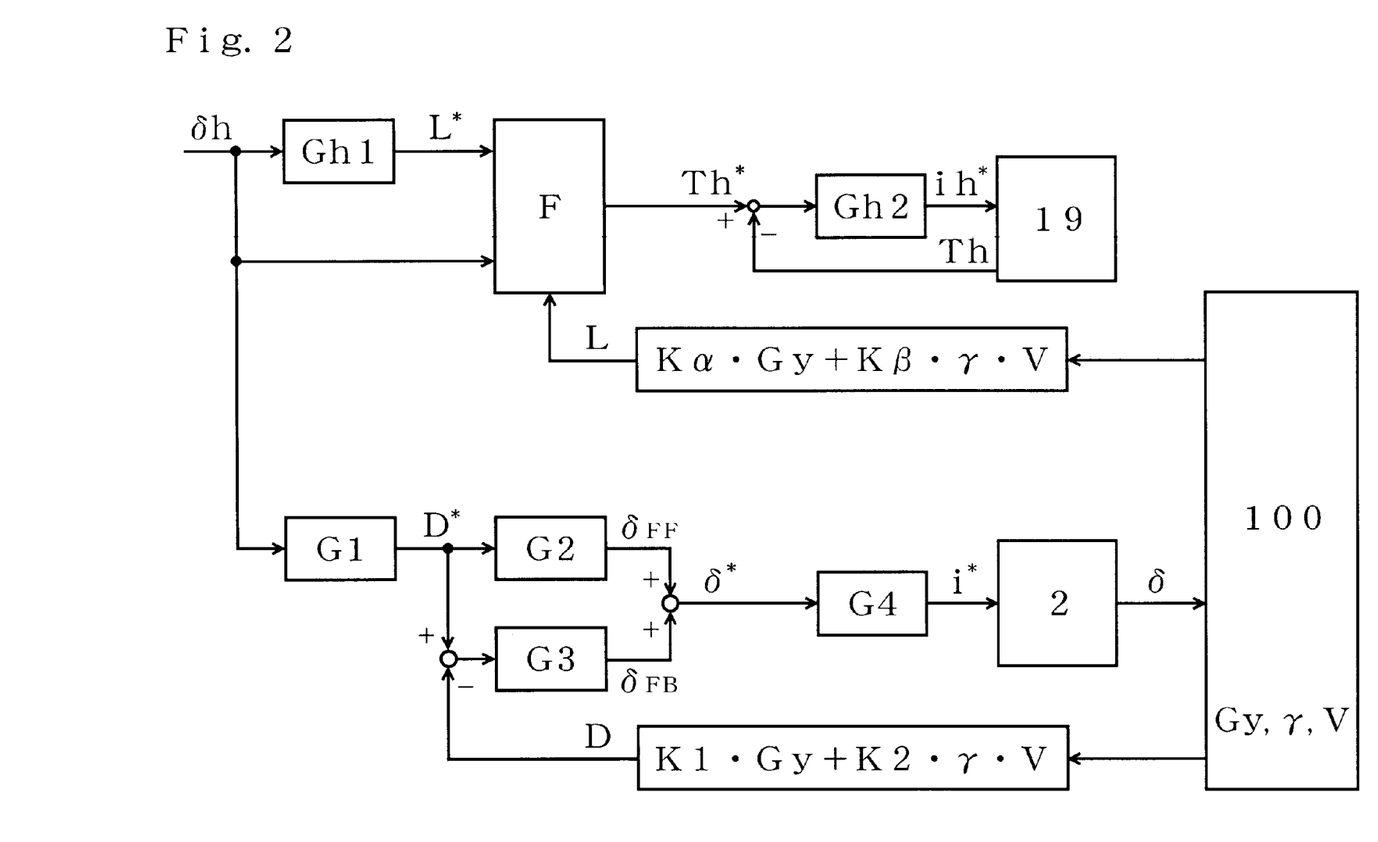
FIG. 2 is a control block diagram of control performed when the vehicle speed is at or above a set vehicle speed in the vehicle steering apparatus according to the embodiment of the present invention.

FIG. 2 shows a control block diagram of control of the operating actuator 19 and steering actuator 2 performed by the control device 20 when the vehicle speed equals or exceeds a preset vehicle speed Va. In FIG. 2, Th* is target operating torque, δ* is target steering angle (target amount of steering), $δ_{FF}$ is steering angle set value, $δ_{FB}$ is steering angle correction value, L* is target behavior index value for operating, D* is target behavior index value for steering, ih* is target driving current for the operating actuator 19, i* is a target driving current for the steering actuator 2, L is behavior index value for operating corresponding to change in behavior of the vehicle 100 caused by variation in steering angle, and D is behavior index value for steering corresponding to change in behavior of the vehicle 100 caused by variation in steering angle.

The behavior index value L for operating is determined according to the following relational expression (1) where Kα is a lateral acceleration weighted ratio, Kβ is a yaw rate weighted ratio, and Kα+Kβ=1.

$$L = Kα·Gy + Kβ·γ·V \qquad (1)$$

This relational expression is stored in the control device 20, and the behavior index value L for operating is calculated from this relational expression and the respective detected values of lateral acceleration Gy, yaw rate γ, and vehicle speed V. The ratio between Kα and Kβ can be set at any value as long as the behavior index value L for operating corresponds to change in behavior of the vehicle caused by change in the steering angle and suitable steering feeling is obtained. This can be a fixed value such as Kα=Kβ=0.5, for example, or can be varied in accordance with vehicle speed or the like which effects change in behavior of the vehicle caused by change in steering angle.

The behavior index value D for steering is determined according to the following relational expression (2), where K1 is a lateral acceleration weighted ratio, K2 is a yaw rate weighted ratio, and K1+K2=1.

$$D = K1·Gy + K2·γ·V \qquad (2)$$

This relational expression is stored in the control device 20, and the behavior index value D for steering is calculated from this relational expression and respective detected values of lateral acceleration Gy, yaw rate γ, and vehicle speed V. The ratio between K1 and K2 can be set at any value as long as the behavior index value D for steering corresponds to change in behavior of the vehicle caused by change in steering angle. This can be a fixed value such as K1=K2=0.5, for example, or can be varied in accordance with vehicle speed or the like which effects change in behavior of the vehicle caused by change in steering angle.

The behavior index value L for operating and the behavior index value D for steering can be equal to each other or different from each other. Further, the behavior index value L for operating and the behavior index value D for steering can be values corresponding to change in behavior of the vehicle caused by change in steering angle, but preferably include a value corresponding to acceleration of change in behavior of the vehicle in at least one direction caused by change in steering angle, such as the lateral acceleration Gy in this embodiment.

The control device 20 calculates the target behavior index value L* for operating corresponding to the detected operating angle δh on the basis of a transfer function Gh1. The transfer function Gh1, which expresses the relationship between δh and L*, is predetermined and stored in the control device 20. The target behavior index value L* for operating is determined by $L^* = Kh_{D1}·V·δh$, for example, where $Kh_{D1}$ is a proportionality constant and $Gh1 = Kh_{D1}·V$. The proportionality constant $Kh_{D1}$ is adjusted such that optimum control can be performed. The transfer function Gh1 is not limited to being proportionate to the vehicle speed V and can be a constant.

The control device 20 calculates the target operating torque Th* corresponding to the detected operating angle δh, target behavior index value L* for operating, and behavior index value L for operating on the basis of a relational expression F which is predetermined and stored. This relational expression F is set as the following expression, for example, where Kt(V) is gain proportionate to the vehicle speed V, and Kc is a constant gain.

$$Th^* = Kt(V)·δh + Kc·(L^* - L)$$

Therefore the operating torque Th can be increased in a transient state in which the behavior index value L for operating has not reached the target behavior index value L* for operating, and thus divergence in behavior of the vehicle can be prevented. The component value Kc·(L*−L) of the target operating torque Th* corresponding to a deviation obtained by subtracting L from L* can be varied in accordance with the vehicle speed V. For example, if Kc=0.05V−0.5, then the operating torque Th can be reduced at low speeds to facilitate steering. Also, a fixed value can be used in place of Kt(V).

In other words, the control device 20 stores a relationship between the operating angle δh, target behavior index value L* for operating, behavior index value L for operating, and target operating torque Th*, and the target operating torque Th* is calculated from this stored relationship, the detected operating angle δh, the determined target behavior index value L* for operating, and the determined behavior index value L for operating.

The control device 20 calculates the target driving current ih* of the operating actuator 19 corresponding to the deviation (Th*−Th) between the target operating torque Th* and the detected operating torque Th on the basis of a transfer function Gh2. This transfer function Gh2 which expresses the relationship between the deviation (Th*−Th) and ih* is predetermined and stored in the control device 20. The operating actuator 19 is driven in accordance with the target driving current ih*. Thus the operating actuator 19 is controlled by the control device 20 such that the operating torque Th corresponds to the target operating torque Th*. The target driving current ih* is determined by ih*=Kbh·[1+1/(Tbh·s)]·(Th*−Th), for example, where Kbh is a gain, Tbh is a time constant, and Gh2=Kbh·[1+1/(Tbh·s)] such that PI control is performed. The gain Kbh and time constant Tbh are adjusted such that optimum control can be performed. The s is Laplace operator.

The control device 20 calculates the target behavior index value D* for steering corresponding to the detected operating angle δh on the basis of a transfer function G1. This transfer function G1 which expresses the relationship between δh and D* is predetermined and stored in the control device 20. The target behavior index value D* for steering is determined by $D^* = K_{D1}·V·δh$, for example, where $K_{D1}$ is a proportionality constant and $G1 = K_{D1}·V$. The proportionality constant $K_{D1}$ is adjusted such that optimum control can be performed. The transfer function G1 is not limited to being proportionate to the vehicle speed V and can be a constant.

The control device 20 calculates the steering angle set value $δ_{FF}$ corresponding to the target behavior index value D* for steering on the basis of a transfer function G2. This transfer function G2 which expresses the relationship between D* and $\delta_{FF}$ is predetermined and stored in the control device 20. The steering angle set value $\delta_{FF}$ is determined by $\delta_{FF}=D*/G_D$ (v), for example, where $G_D$ (V) is a steady gain of the lateral acceleration relative to the steering angle and $G2=1/G_D$ (v). This gain $G_D$ (v) is determined by the following expression, where SF is stability factor and H is wheel base.

$$G_D(v)=V^2/\{(1+SF \cdot V^2) \cdot H\}$$

The control device 20 calculates a deviation (D*−D) which is obtained by subtracting the behavior index value D for steering, which is determined on the basis of the detected lateral acceleration Gy, the detected yaw rate γ, and the detected vehicle speed V, from the target behavior index value D* for steering, and calculates the steering angle correction value $\delta_{FB}$ corresponding to this deviation (D*−D) on the basis of a transfer function G3. This transfer function G3, which expresses the relationship between the deviation (D*−D) and $\delta_{FB}$, is predetermined and stored in the control device 20. The steering angle correction value $\delta_{FB}$ is determined by $\delta_{FB}=(Kp+Ki/s) \cdot (D*-D)/G_D$ (v), for example, where Kp is proportional gain, Ki is integral gain, s is Laplace operator, and $G3=(Kp+Ki/s)/G_D$ (v) such that PI control is performed. Kp and Ki are adjusted such that optimum control can be performed.

The control device 20 calculates the target steering angle $\delta*$ as the sum of the steering angle set value $\delta_{FF}$ and the steering angle correction value $\delta_{FB}$. That is, the control device 20 stores a relationship between the target behavior index value D* for steering, the behavior index value D for steering, and the target steering angle $\delta*$, and calculates the target steering angle $\delta*$ from the stored relationship, the determined target behavior index value D* for steering, and the behavior index value D for steering. The steering angle set value $\delta_{FF}$ corresponds to a feedforward element in the control of the steering actuator 2, and the steering angle correction value $\delta_{FB}$ corresponds to a feedback element in the control of the steering actuator 2, and thus integrated control comprised of feedforward control and feedback control is performed for the steering actuator 2.

The control device 20 calculates the target driving current i* of the steering actuator 2 corresponding to the target steering angle δ8* on the basis of a transfer function G4. This transfer function G4 which expresses the relationship between δ* and i* is predetermined and stored in the control device 20. The target driving current i* is determined by $i*=Kb[1+1/(Tb \cdot s)] \sim \delta*$, for example, where Kb is a gain, Tb is a time constant, and $G4=Kb \cdot [1+1/(Tb \cdot s)]$ such that PI control is performed. The gain Kb and time constant Tb are adjusted such that optimum control can be performed. The steering actuator 2 is driven in accordance with the target driving current i*. Thus the steering actuator 2 is controlled by the control device 20 such that the steering angle δ corresponds to the target steering angle δ*, and by means of this control the ratio between the operating angle δh and the steering angle δ varies in accordance with variation in the vehicle driving conditions such as the operating angle δh and vehicle speed V.

Figure 3:
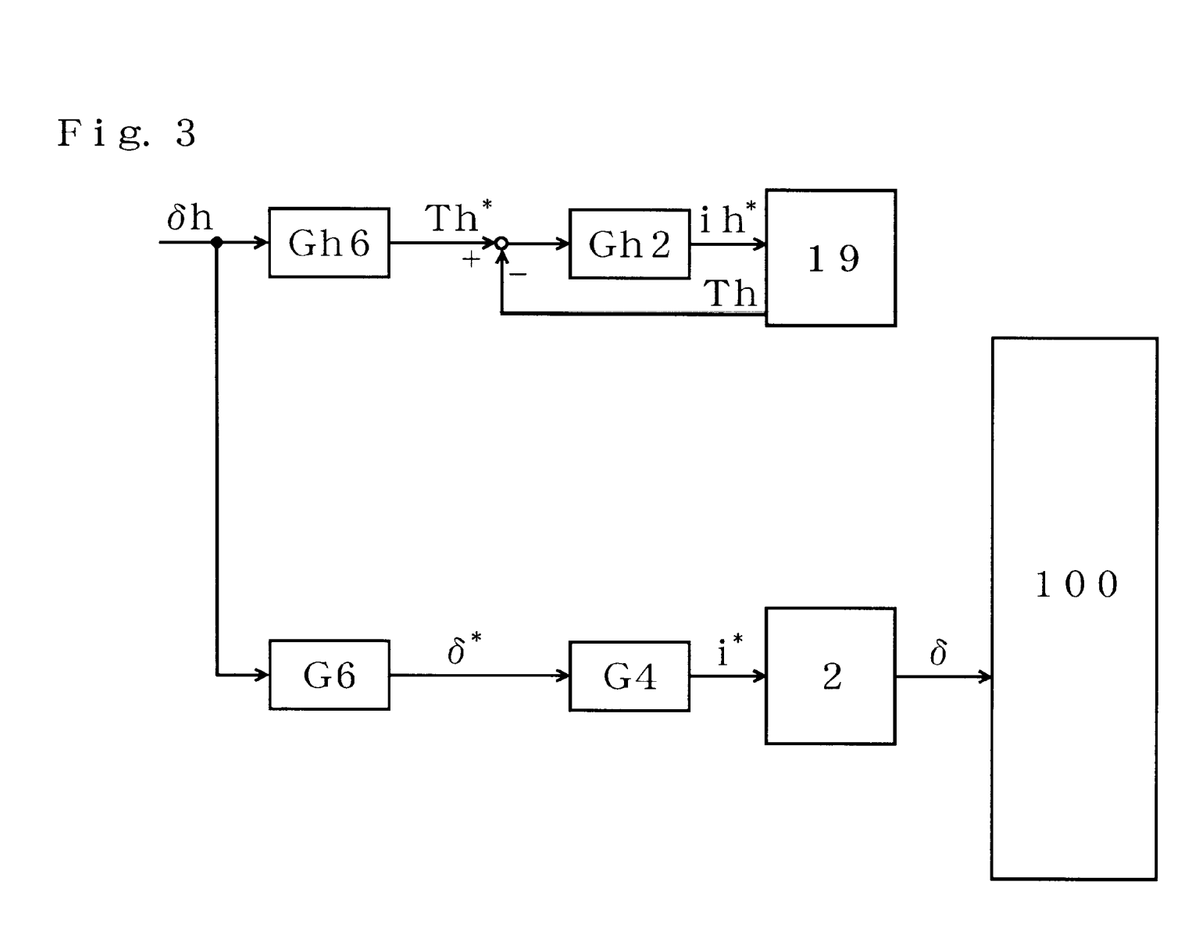
FIG. 3 is a control block diagram of control performed when the vehicle speed is less than the set vehicle speed in the vehicle steering apparatus according to the embodiment of the present invention.

FIG. 3 shows a control block diagram of control of the operating actuator 19 and steering actuator 2 performed by the control device 20 when the vehicle speed is less than a preset vehicle speed Va. Here, the method of determining the target operating torque Th* and target steering angle δ* differs from that when the vehicle speed V equals or exceeds Va. In FIG. 3, Gh6 is a transfer function of Th* relative to δh, and G6 is a transfer function of δ* relative to δh. The preset vehicle speed Va can be determined such that when the vehicle speed V equals or exceeds Va, the target operating torque Th* can be set appropriately on the basis of the behavior index value L for operating and the target steering angle δ* can be set appropriately on the basis of the behavior index value D for steering, at 2.78 m/s for example.

The control device 20 calculates the target operating torque Th* corresponding to the detected operating angle δh on the basis of the transfer function Gh6. This transfer function Gh6 is predetermined and stored in the control device 20. The target operating torque Th* is determined by Th*=Kha(v)·δh, for example, where the proportional gain is set as a function Kha(v) of the vehicle speed V and Gh6=Kha(v). Further, at the preset vehicle speed Va, the target operating torque Th* determined on the basis of the transfer function Gh6 is set equal to the element Kt(v)·δh in the target operating torque Th* determined on the basis of the aforementioned relational expression, in which the element is not affected by the behavior index value L for operating. Thus the following expression is established.

$$Th*=Kt(v) \cdot \delta h=Kha(v) \cdot \delta h$$

The value of Kha(v) is determined by setting a value at vehicle speed V=0 m/s, for example, and interpolating between this value and a value of Kt(v) at V=2.78 m/s.

The control device 20 calculates the target steering angle δ* corresponding to the detected operating angle oh on the basis of the transfer function G6. This transfer function G6 is predetermined and stored in the control device 20. The target steering angle δ* is determined by δ*=Ka(v)·δh, for example, where the proportional gain Ka(v) is set as a function of the vehicle speed V such that G6=Ka(v). Further, at the preset vehicle speed Va, the target steering angle δ* determined on the basis of the transfer function G6 and the steering angle set value $\delta_{FF}$ determined on the basis of the aforementioned transfer functions G1, G2 are set equally to each other. Thus the following expression is established.

$$\delta*=\delta_{FF}=\{K_{D1 \cdot Va/GD}(v)\} \cdot \delta h=Ka(v) \cdot \delta h$$

The value of Ka(v) is determined by setting a value at vehicle speed V=0 m/s, for example, and interpolating between this value and a value of $\{K_{D1} \cdot Va/G_D(v)\}$ at V=2.78 m/s.

Figure 4:
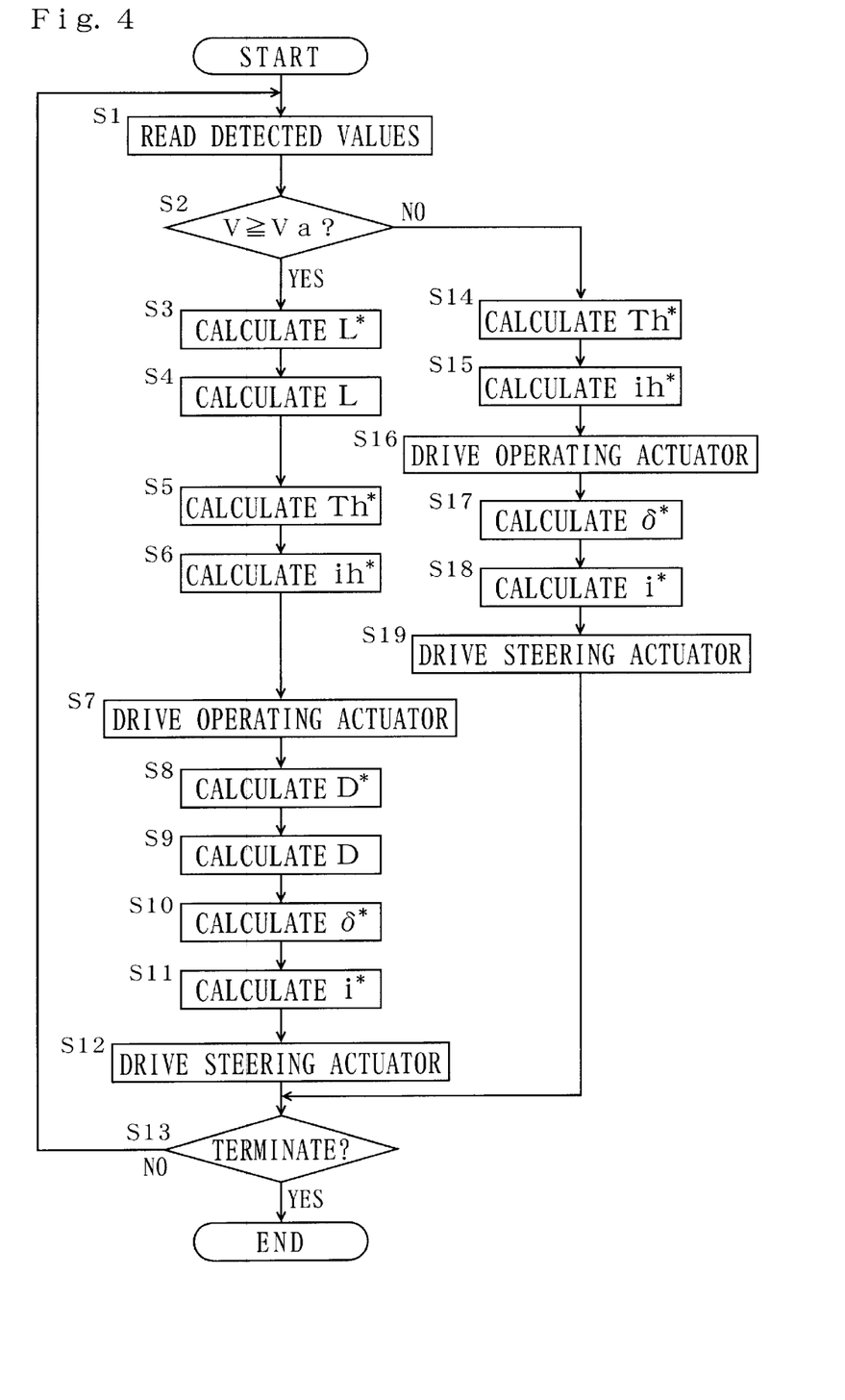
FIG. 4 is a flowchart showing a control procedure of an operating actuator and a steering actuator in the vehicle steering apparatus according to the embodiment of the present invention.

The control procedure performed by the control device 20 is described with reference to the flowchart in FIG. 4. First, the detected data from the sensors are read (step S1). Then, a judgment is made as to whether or not the vehicle speed V is equal to or above the set value Va (step S2). If the vehicle speed V is equal to or greater than the set value Va in step S2, the target behavior index value L* for operating corresponding to the detected operating angle δh is calculated (step S3), the behavior index value L for operating is calculated on the basis of the detected values of the lateral acceleration Gy, yaw rate γ, and vehicle speed V (step S4), and the target operating torque Th* is calculated from the target behavior index value L* for operating, the behavior index value L for operating, and the detected operating angle δh (step S5). Next, the target driving current ih* of the operating actuator 19 corresponding to the target operating torque Th* and detected operating torque Th is calculated (step S6), and a driving signal of the operating actuator 19 is outputted in accordance with the target driving current ih* (step S7). Then, the target behavior index value D for steering corresponding to the detected operating angle δh is calculated (step S8), the behavior index value D for steering is calculated on the basis of the detected values of the lateral acceleration Gy, yaw rate γ, and vehicle speed V (step S9), and the target steering angle δ* is calculated as the sum of the steering angle set value $\delta_{FF}$ corresponding to the target behavior index value D* for steering, and the steering angle correction value $\delta_{FB}$ corresponding to the target behavior index value D* for steering and behavior index value D for steering (step S10). The target driving current i* of the steering actuator 2 corresponding to the target steering angle δ* is calculated (step S11), and the driving signal of the steering actuator 2 is outputted in accordance with the target driving current i* (step S12). Next, a judgment is made as to whether or not control is terminated according to whether or not the ignition switch of the vehicle is ON, for example (step S13), and if control is not terminated the procedure returns to step S1. If, in step S2, the vehicle speed V is less than the set value Va, the target operating torque Th* is calculated in accordance with the detected operating angle δh (step S14), the target driving current ih* of the operating actuator 19 corresponding to the target operating torque Th* and detected operating torque Th is calculated (step S15), and the driving signal of the operating actuator 19 is outputted in accordance with the target driving current ih* (step S16). The target steering angle δ* is calculated in accordance with the detected operating angle δh (step S17), the target driving current i* of the steering actuator 2 is calculated in accordance with the target steering angle δ* (step 18), the driving signal of the steering actuator 2 is outputted in accordance with the target driving current i* (step S19), and the procedure advances to step S13.

According to the structure described above, by causing torque to act upon the operating member 1 by controlling the operating actuator 19 on the basis of change in behavior of the vehicle due to variation in steering angle, the driver can be provided with steering feeling which is matched to actual change in steering angle. Furthermore, since there is no need to consider inertia, viscosity, elasticity, friction, and so on in the steering force transmission system, time and resources required for developing a control system for the operating actuator 19 can be greatly reduced. Since the steering actuator 2 is also controlled on the basis of change in behavior of the vehicle caused by variation in steering angle, there is no need to consider inertia, viscosity, elasticity, friction, and so on in the steering force transmission system, and thus the time and resources required for developing a control system for the steering actuator 2 can also be greatly reduced.

Figure 5:
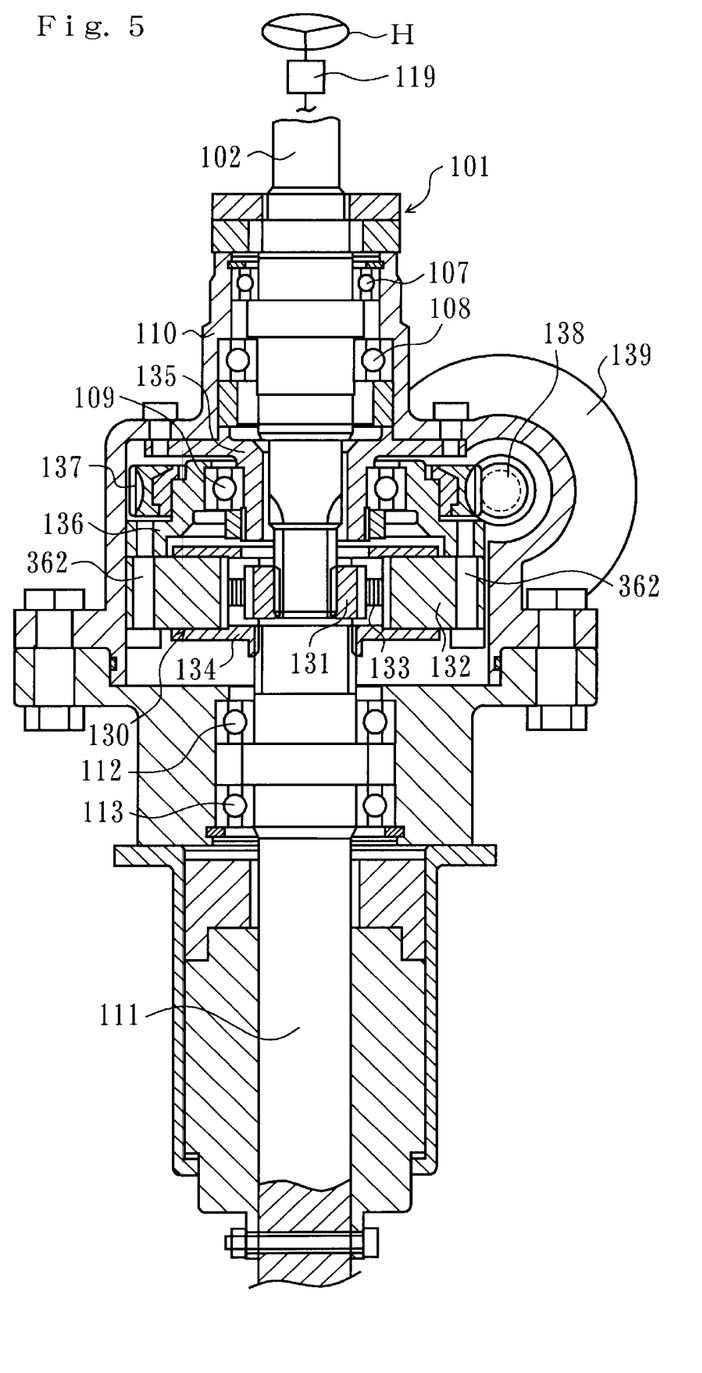
FIG. 5 is an illustrative structural diagram of a vehicle steering apparatus according to a modified example of the present invention.

The present invention is not limited to the aforementioned embodiment. For example, as illustrated in the modified example in FIG. 5, the present invention can be applied to a steering apparatus 101 in which a steering wheel H that is an operating member is mechanically connected to the vehicle wheels, and the ratio between the amount of operation of the operating member and the amount of steering of the vehicle wheels can be varied. In this steering apparatus 101, a rotation of an input shaft 102 responding to the operation of the steering wheel H is transmitted to an output shaft 111 by a rotation transmission mechanism 130, and the rotation of the output shaft 111 is transmitted to the vehicle wheels by a steering gear (not shown) such that the steering angle is varied. A known device such as a rack and pinion type steering gear or a ball screw type steering gear can be used as the steering gear. The input shaft 102 and the output shaft 111 are disposed coaxially with a gap, and are supported by housing 110 via bearings 107, 108, 112, 113. In this modified example the rotation transmission mechanism 130 is a planetary gear mechanism in which planetary gears 133 which are meshed with a sun gear 131 and a ring gear 132 are supported by a carrier 134. The sun gear 131 is connected to an end portion of the input shaft 102 so as to rotate together with the input shaft 102, and the carrier 134 is connected to the output shaft 111 so as to rotate together with the output shaft 111. The ring gear 132 is fixed to a holder 136 which surrounds the input shaft 102 via bolts 362. A tubular member 135 which is fixed to the housing 110 so as to surround the input shaft 102 supports the holder 136 via a bearing 109. A worm wheel 137 is fitted onto the outer circumference of the holder 136 so as to rotate together with the holder 136. A worm 138 which is meshed with the worm wheel 137 is supported by the housing 110. The worm 138 is driven by a steering actuator 139 attached to the housing 110. An operating actuator 119 is provided for generating torque which acts upon the steering wheel H. The operating actuator 119 and steering actuator 139 are controlled in a similar manner to the aforementioned embodiment.

What is claimed is:

1. A vehicle steering apparatus comprising:
   an operating member;
   an operating actuator for generating torque which acts upon the operating member;
   a steering actuator;
   a steering gear for transmitting movement of the steering actuator to vehicle wheels so that variation in steering angle is generated;
   a sensor for detecting amount of operation of the operating member;
   a sensor for detecting amount of steering of the vehicle wheels;
   means for controlling the steering actuator such that the ratio between the amount of operation of the operating member and the amount of steering of the vehicle wheels is varied;
   means for determining behavior index value for operating corresponding to change in behavior of the vehicle caused by change in steering angle;
   means for storing a relationship between the amount of operation of the operating member and target behavior index value for operating;
   means for calculating the target behavior index value for operating from the stored relationship and the detected amount of operation;
   means for storing a relationship between the behavior index value for operating, the target behavior index value for operating, and target operating torque;
   means for calculating the target operating torque from the stored relationship, the determined behavior index value for operating, and the determined target behavior index value for operating; and
   means for controlling the operating actuator such that operating torque of the operating member corresponds to the target operating torque.

2. The vehicle steering apparatus according to claim 1, wherein said means for determining the behavior index value for operating comprise a sensor for detecting value which corresponds to acceleration of change in behavior of the vehicle in at least one direction caused by change in steering angle.

3. The vehicle steering apparatus according to claim 1, comprising:
   means for determining behavior index value for steering corresponding to change in behavior of the vehicle caused by change in steering angle;
   means for storing a relationship between the amount of operation of the operating member and target behavior index value for steering;

means for calculating the target behavior index value for steering from the stored relationship and the detected amount of operation;

means for storing a relationship between the behavior index value for steering, the target behavior index value for steering, and target amount of steering; and means for calculating the target amount of steering from the stored relationship, the determined behavior index value for steering, and the determined target behavior index value for steering, wherein said steering actuator is controlled such that the amount of steering of the vehicle wheels corresponds to the target amount of steering.

4. The vehicle steering apparatus according to claim 3, wherein said means for determining the behavior index value for steering comprise a sensor for detecting value which corresponds to acceleration of change in behavior of the vehicle in at least one direction caused by change in steering angle.

5. The vehicle steering apparatus according to claim 1, wherein the target operating torque includes a component value corresponding to a deviation obtained by subtracting the behavior index value for operating from the target behavior index value for operating.

6. The vehicle steering apparatus according to claim 5, wherein the component value corresponding to the deviation obtained by subtracting the behavior index value for operating from the target behavior index value for operating varies in accordance with vehicle speed.

* * * * *